July 28, 1959

R. G. GIDLOW 2,896,291

ADJUSTABLE CLAMPING DEVICE

Filed April 30, 1956

INVENTOR.
ROLF G. GIDLOW
BY Robert U. Geil, Jr.
ATTORNEY

July 28, 1959 R. G. GIDLOW 2,896,291
ADJUSTABLE CLAMPING DEVICE
Filed April 30, 1956 2 Sheets-Sheet 2

INVENTOR.
ROLF G. GIDLOW
BY Robert U. Geib, Jr
ATTORNEY

United States Patent Office 2,896,291
Patented July 28, 1959

2,896,291

ADJUSTABLE CLAMPING DEVICE

Rolf G. Gidlow, St. Paul, Minn., assignor to The Pillsbury Company, a corporation of Delaware Application April 30, 1956, Serial No. 581,490

1 Claim. (Cl. 24—248)

This invention relates to clamping devices, and more particularly to adjustable clamps which may be used on closures of various types, although not limited thereto.

In numerous installations, it is desirable to utilize an adjustable device for clamping together certain elements which may be quickly and easily brought together and separated when the occasion requires. One such instance is in the art of screw conveyors which are encased in longitudinally split cylindrical housings wherein one of the components thereof is hingedly mounted in order to provide access to the conveyor for cleaning and/or repair. The components of such split cylindrical housings must not only be firmly held together, but, in many instances, gaskets must be employed in order to prevent the escape from the housing of the material being conveyed.

While capscrews and other fastening elements may be used for effectively holding together the separable components of the housing, they are quite time-consuming to install and remove.

It is among the objectives of the present invention to provide a novel and improved adjustable clamping device for effectively holding together various separable elements, the said clamping device possessing the further characteristic of being susceptible of quick and easy movement into and out of operative position.

Another object is the attainment of all of the immediately foregoing advantages with a device which is simple and inexpensive to manufacture, easy to install on many types of separable elements, and durable in service.

The invention, then, comprises the features hereinafter fully described and as particularly pointed out in the claims, the following description and the annexed drawings setting forth in detail certain illustrative embodiments of the invention, these being indicative of but several of a number of ways in which the principles of the invention may be employed.

Figure 1:
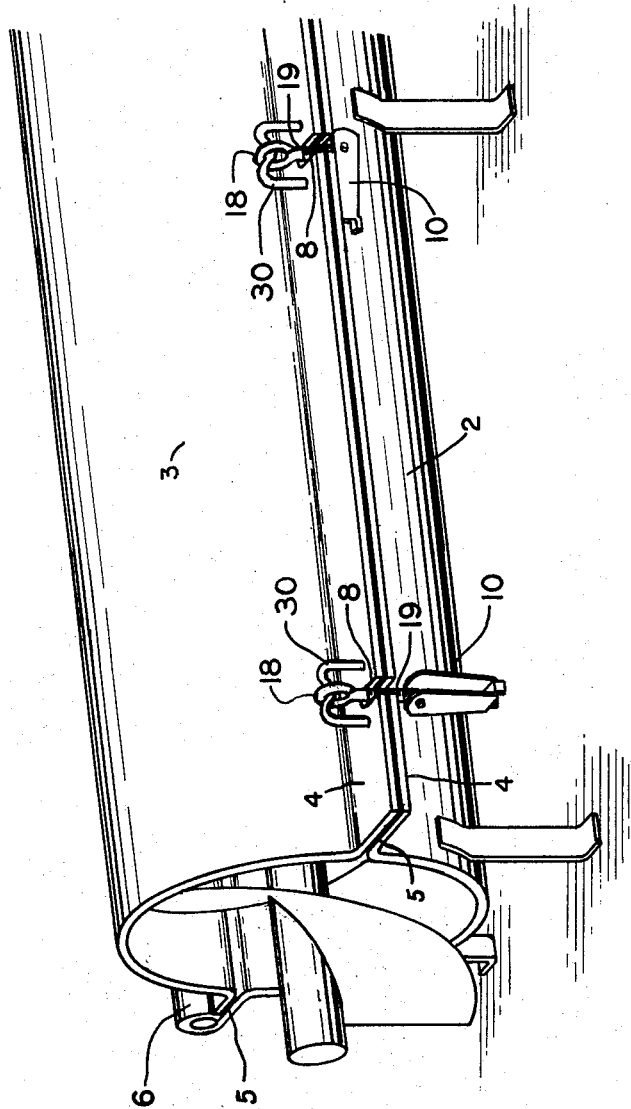
Figure 1 is a perspective illustrating the clamping device of the present invention as applied to the split housing of a screw-type conveyor, the said housing being fragmentarily shown.

Referring more particularly to the drawings, the numerals 2 and 3 designate the lower and upper halves, or sections, of a split housing for a screw-type conveyor.

The longitudinal edges of both the lower section 2 and the upper section 3 of the housing are flattened, as shown at 4, with a gasket 5 disposed between them; and, along one of these longitudinal edges, the sections are hingedly connected as shown at 6.

The adjustable clamping device of the present invention is shown as applied to the free, or unhinged, longitudinal edges of the lower and upper sections 2 and 3 of the longitudinally split housing. These free edges of the longitudinally split housing are shown as substantially flat and are provided with a pair of aligned inwardly extending slots 8.

Figure 3:
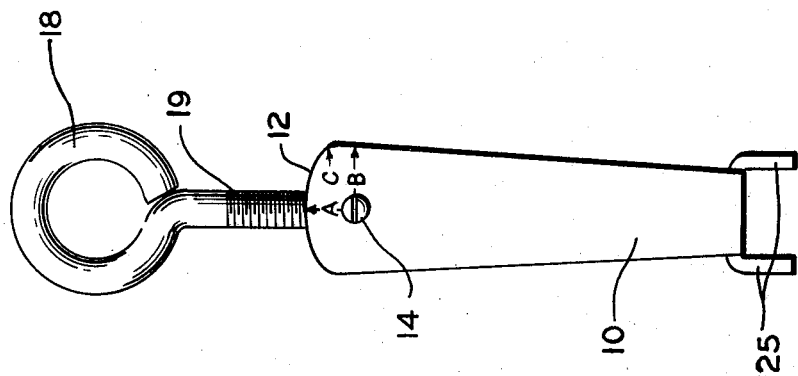
Figure 3 is a view similar to that of Figure 2, but taken at right-angles with respect thereto.

The largest and most basic element of the device of the present invention comprises a bifurcated lever 10 comprising a pair of substantially flat and parallel leg portions whose side edges are substantially straight and outwardly flared. The outer ends of the leg portions of the bifurcated lever 10 are curved, as at 12, in the manner of companion cam surfaces. As shown most clearly in Figure 3, the central arcuate areas of these companion cam surfaces are aligned with the longitudinal axes of the legs of the bifurcated lever by which they are carried. A pair of opposed screws 14 extend through the legs of the bifurcated lever 10 adjacent their outer ends and project inwardly therefrom to pivotally support a short bushing or ferrule 15 which is shown as taking the form of a hexagonal nut with an enlarged central bore 16. It will be observed that the opposed screws 14 are disposed in alignment with the longitudinal axes of the legs of the bifurcated lever 10.

The numeral 18 designates an eyelet having an elongate screw-threaded shank 19, the said eyelet 18 being disposed outside of, but adjacent, the outer ends of the legs of the bifurcated lever 10 with its elongate screw-threaded shank 19 extending through, and projecting from, the enlarged central bore of the ferrule 15.

A hexagonal nut 21 having an internally threaded bore 24 is threaded onto the end of the screw-threaded shank 19 which projects from the ferrule 15; and between these elements (i.e., 21 and 15), the screw-threaded shank 19 carries a lock-washer 23.

The closed end of the bifurcated lever 10 is shown as of substantially U-shape; and a pair of ears 25 project from the bottom of the U, the same being substantially flat and right-angularly disposed with respect to the major planes of the leg portions of the bifurcated lever, as shown. These parallel ears permit the ready application thereto of a tool (not shown) for the purpose of applying leverage to the bifurcated lever 10 to assist in moving it from its closed or clamping position, should this become necessary or desirable. However, it will be found that, in most instances, the device of the invention may be easily operated with the thumb and forefinger.

Figure 2:
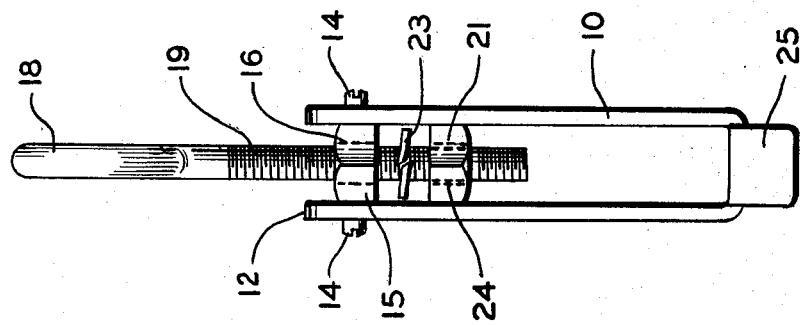
Figure 2 is a side elevational view of the clamping device of Figure 1.
Figure 4:
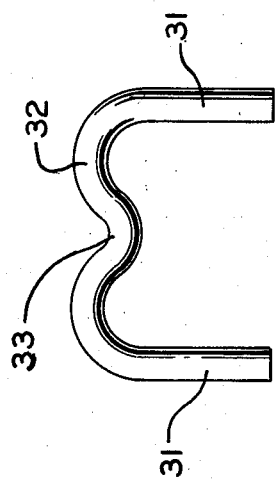
Figure 4 is an elevational view of an element to which part of the device of the present invention may be attached.

Referring to Figure 2, the curvature of both of the cam faces 12 on the outer ends of the legs of the bifurcated lever 10 is the same; and it may be of substantially unvarying radius.

The screws 14 pivotally support the ferrule 15 at all times, and thereby prevent its dislocation from any cause. These screws 14, while substantially equidistant from the side edges of the bifurcated lever 10 are closer to the cam faces 12 than to said side edges; this relationship being represented by the arrows A and B, respectively, in Figure 3.

The eyelet 18 may be made to engage and cooperate with any suitable contacting surface on one of the members to be clamped together. In the illustrative embodiment shown in Figure 1 of the drawings, a substantially rectangular loop 30 is secured to one of the members to be clamped together, the said loop comprising a pair of parallel legs 31 which are connected by a transverse member 32, the latter being provided with a detent 33 in which the inner surface of the eyelet 18 may seat. Thus, in addition to serving as a hanger or contacting member for the eyelet 18, the loop 30 prevents the eyelet and its associated elements from being displaced.

It will be understood by those skilled in the art that various other headed members on the screw-threaded shank 19 may be utilized in lieu of the eyelet 18.

In any event, the headed member which is associated with the screw-threaded shank 19 either directly or indirectly engages the outer side of one of the members to be clamped together; and the outer side of the other member is contacted by the cam surfaces 12 on the open ends of the bifurcated lever 10. Then, the bifurcated lever 10 is pivotally moved about the screws 14 until the substantially straight side edges of its leg portions make contact with the adjacent surface of the member to be clamped. During this movement the camming action which began at point A gradually increases, reaching its maximum at point C (which is spaced further outward from the axis of the ferrule 15 and its supporting screws 14), and then partially recedes as point B is reached. Due to the disposition of the screws 14 (which support the ferrule 15) in alignment with the longitudinal axis of the bifurcated lever, the equidistant spacing of said screws from the side edges of said lever, and the curvature of the cam surfaces 12, the camming action of the bifurcated lever is the same in either direction.

The lock washer 23 provides resiliency between the hexagonal adjusting nut 21 and the ferrule 15; and permits the cam surfaces 12 on the bifurcated lever to function in the manner described hereinbefore providing a snap action as the bifurcated lever is moved into full clamping position.

This feature of resiliency as provided by the lock washer 23 is particularly important when the device of the invention is used to clamp together members which are not compressible, as where no gasket is disposed therebetween.

While I have shown and described certain specific embodiments of the present invention, it will be readily understood by those skilled in the art that I do not wish to be limited exactly thereto, since various modifications may be made without departing from the scope of the invention as defined in the appended claim.

I claim:

A clamping device comprising a headed member having a screw-threaded shank; an adjustable stop member for screw-threaded engagement with the shank of said headed member; a bifurcated lever having the outer edges of its open ends curved to provide a pair of cam surfaces; a ferrule slidable on the shank of said headed member except when said clamping device is in clamping position; said ferrule being disposed between the head of said headed member and said stop member and pivotally secured at its sides to the bifurcation of said lever at positions which are adjacent to, but spaced from, said cam surfaces and aligned with the longitudinal axis of said lever; and a resilient element disposed between said ferrule and said stop member; each of said cam surfaces being so shaped as to provide a central arcuate area which is aligned with the longitudinal axis of said lever and with a high-rise camming area at either side thereof, with each of the latter areas terminating in a receding low point.

References Cited in the file of this patent

UNITED STATES PATENTS

| 301,418 | Williams | July 1, 1884 |
| 2,043,125 | Stahl | June 2, 1936 |
| 2,398,962 | Randrup | Apr. 23, 1946 |
| 2,796,899 | Bird | June 25, 1957 |

FOREIGN PATENTS

| 21,838 | Great Britain | 1896 |